United States Patent [19]

Kinuhata et al.

[11] Patent Number: 5,074,346
[45] Date of Patent: Dec. 24, 1991

[54] TIRE GROOVING APPARATUS

[75] Inventors: Satoru Kinuhata, Kobe; Seiki Yamada, Ibaraki; Masao Takami, Kobe; Eiji Shibata, Nakama; Tadahiko Tamura, Kitakyushu, all of Japan

[73] Assignee: Sumitomo Rubber Industries Ltd., Hyogo, Japan

[21] Appl. No.: 460,101

[22] PCT Filed: Jun. 7, 1989

[86] PCT No.: PCT/JP89/00583
§ 371 Date: Feb. 8, 1990
§ 102(e) Date: Feb. 8, 1990

[87] PCT Pub. No.: WO89/11967
PCT Pub. Date: Dec. 14, 1989

[30] Foreign Application Priority Data

Jun. 10, 1988 [JP] Japan ................. 63-143903

[51] Int. Cl.⁵ ..................... B29D 30/68; B23C 3/28
[52] U.S. Cl. .......................... 157/13; 82/12
[58] Field of Search ..................... 82/12; 157/13

[56] References Cited

FOREIGN PATENT DOCUMENTS 0190914 8/1986 European Pat. Off. .
2403183 4/1979 France .
47-113773 11/1972 Japan .
60-20288 2/1985 Japan .

*Primary Examiner*—William E. Terrell
*Attorney, Agent, or Firm*—Birch, Stewart, Kolasch & Birch

[57] ABSTRACT

A tire grooving apparatus according to the present invention consists of a movable carriage (3) adapted to be moved at least in the direction parallel with a tire support shaft (21), a vertically movable block (32) provided on the carriage (3) and adapted to be moved freely in the vertical direction, and a pivotable arm (4), provided on the block (32), having a cutter support unit (5) at the free end portion thereof. The cutter support unit (5) of the invention is movable up and down independently of movable block (32). As the cutter support unit (5) which is attached to the free end portion of the pivotable arm (4) can be so moved up and down independently, the depth of a tread pattern groove can be adjusted and a cutting position of a cutter (6) set arbitrarily, without replacing the cutter (6), without moving the block (32) vertically and without need of a program for correcting the quantity of movement of the cutter.

2 Claims, 7 Drawing Sheets

TIRE GROOVING APPARATUS

DESCRIPTION

1. Technical Field

The present invention relates to a tire grooving apparatus, and more particularly relates to a tire grooving apparatus, wherein a cutter support can be moved up and down independently, so as to carve tread grooves having various depths by means of a cutter of the same shape and size.

2. Background Art

Conventionally, the work of grooving a tire for trial manufacturing and limited scale production, namely carving the tread pattern grooves in plain cured tires without any tread pattern is generally performed by means of a hand cutter, and it requires skill and a lot of time.

Taking the above-mentioned problems into consideration, the present applicants have already proposed a tire grooving apparatus having, as main constructive features, a cutting device attached to a laterally movable carriage which is moved in parallel and perpendicular directions against the tire support shaft; a pivotable arm support shaft which is extended from the carriage; a pivotable arm attached to the support shaft; a cutter holder which is pivotably attached to the pivotable arm perpendicular to the axis thereof; a cutter which is held by the end portion of the cutter holder; and the cutting position of the cutter arranged to be on the extended axis of the support shaft (Japanese Unexamined Patent Publication No. 54240/1988 and 177232/1986).

In the present specification, the cutting position of cutter means a peculiar point of cutter which is a certain distance (M) (including zero) from the bottom end of the cutter holder (refer to FIG. 3).

The carving of tread pattern grooves for plain tires utilizing the tire grooving apparatus is carried out by setting the cutting position to the tangential line (Processing Standard Point for Tread) of plain tire. Thus, since the cutting position of the cutter is kept always on the extended axis of the pivotable arm support shaft, namely on the tangential line of the plain tire, calculation of quantity of movement of the movable carriage and the pivotable arm becomes simple, programming of computer programs becomes easy and accurate grooving becomes possible. However, when different depth of tread patterm grooves are carved by the tire grooving apparatus, for example, to carve deeper grooves, it is necessary for the cutter to be changed for a cutter of longer effective length. On the other hand, when shallow depth grooves are carved, it is necessary for the cutter to be changed for a cutter of shorter effective length. This produces a problem that the operation of the tire grooving apparatus is not easy. Moreover, if different depth of tread pattern grooves are carved without changing the cutter, displacement occurs between the cutting position and the processing standard point for the tread (refer to FIG. 8B). In such a condition, if a groove whose center line is parallel to the center vertical line of the tire tread is carved in zigzag on the tire plane, the zigzag pitches of the grooves become different from one another. When grooves whose vertical center line inclined to the center vertical line of tire tread are carved, it is not possible to maintain carving accuracy since the center of the groove does not coincide with the processing standard point of the tread. Accordingly, it is necessary to adjust the quantity of movement of the cutter in accordance with the degree of difference between the cutting position of cutter and the processing standard point of the tread. In this case, there is the problem that the control program for cutter movement becomes complicated.

It is thus an object of the present invention to solve the above-mentioned problems and to provide a tire grooving apparatus, wherein the cutter support unit is moved up and down independently, so as to carve grooves having various depths by using a cutter of the same shape and size.

SUMMARY OF THE INVENTION

A tire grooving apparatus of the present invention comprises;
(a) a tire support shaft which rotatably supports a tire,
(b) a cutter support unit which is independently movable in the vertical direction,
(c) a pivotable arm which holds the cutter support unit at the free end portion thereof,
(d) a vertically movable block having a rotatable shaft which pivotably holds the pivotable arm, and
(e) a movable carriage which holds the vertically movable block in such a manner which allows the block to move vertically and which can be at least moved in the transverse direction which is parallel with the tire support shaft.

In the tire grooving apparatus of the present invention, since the cutter support unit which is moved up and down independently is attached to the free end portion of the pivotable arm, the depth of a tread pattern groove can be adjusted and a cutting position of a can be cutter set arbitrarily without moving the block vertically and without changing cutters and without the need of a program for correcting the quantity of movement of the cutter.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Hereinafter, the present invention is described in detail based on the drawings.

Figure 1:
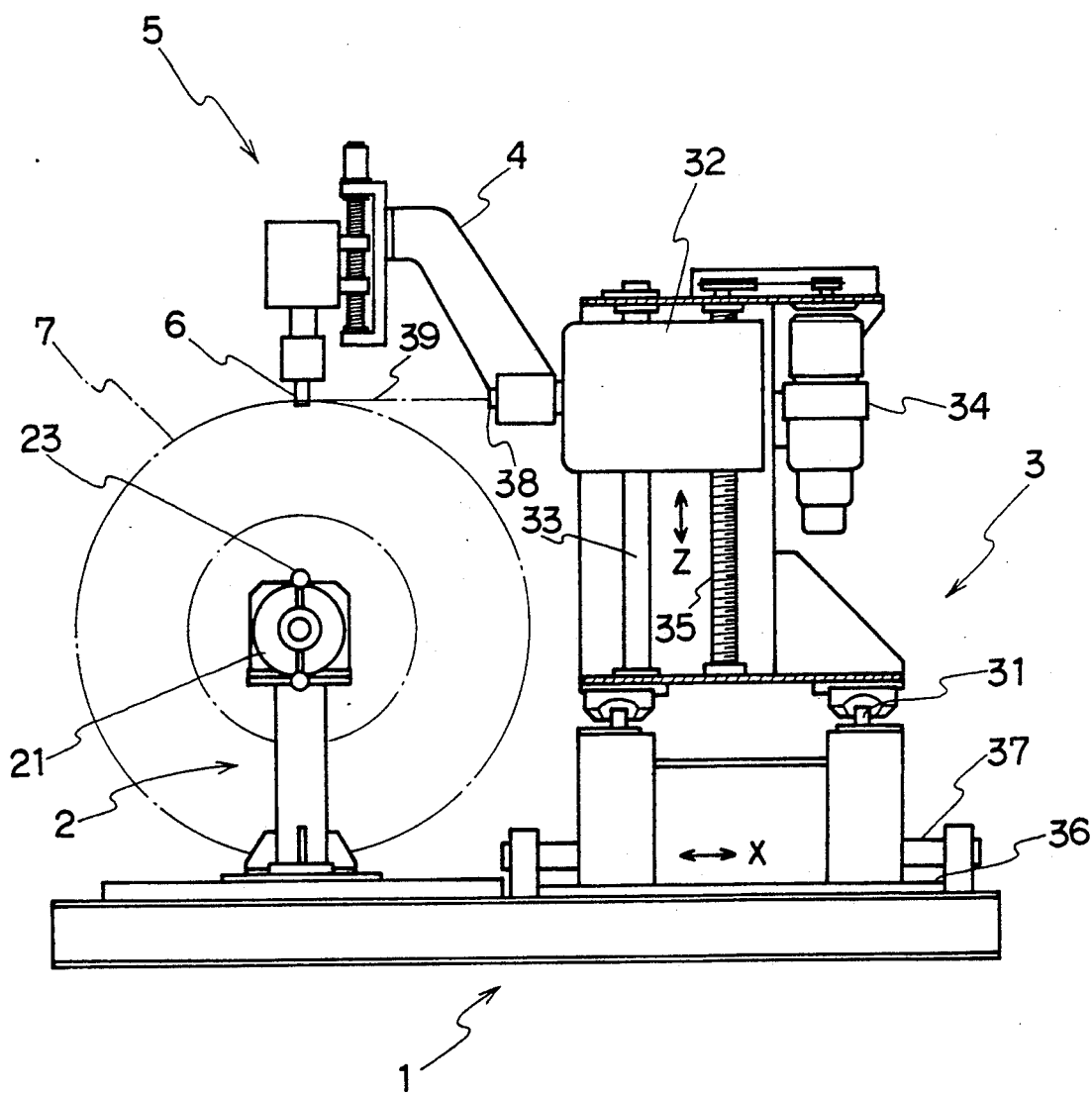
FIG. 1 is a side view of a tire grooving apparatus of one embodiment of the present invention.
Figure 2:
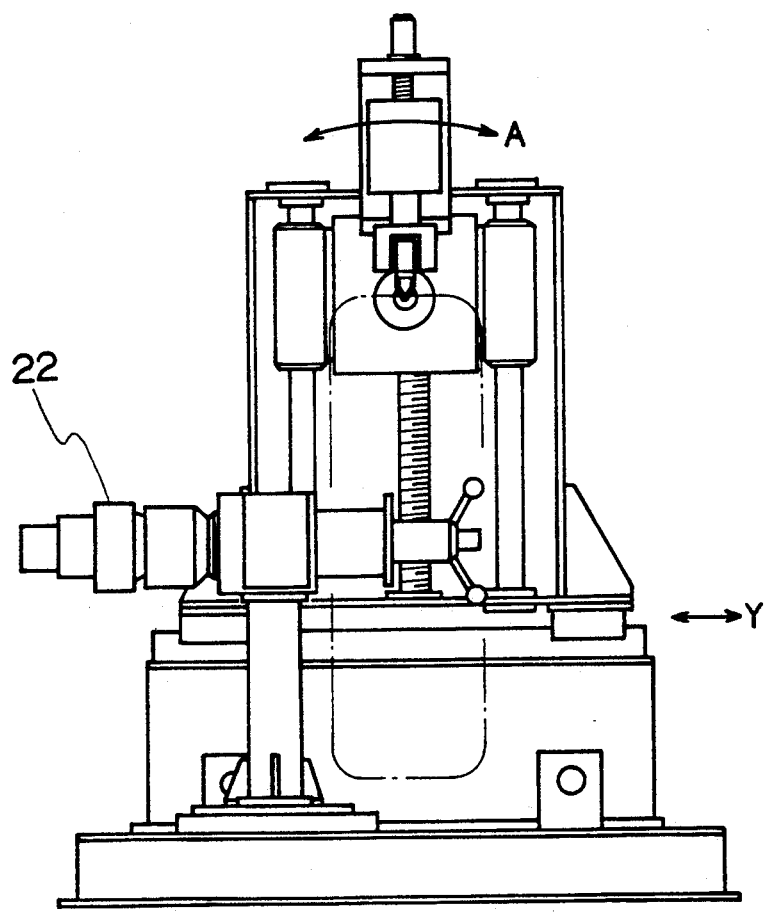
FIG. 2 is a front view of the tire grooving apparatus shown in FIG. 1.

In FIGS. 1 and 2, numeral 1 indicates a base, numeral 2 indicates a tire support unit, numeral 3 indicates a laterally movable carriage, numeral 4 indicates a pivotable arm, numeral 5 indicates a cutter support unit, numeral 6 indicates a cutter and numeral 7 indicates a tire.

The tire support unit 2 is fixed on the base 1, equipped with the tire 7 on the tire support shaft 21 and rotates through a reduction gear (not shown) by a motor 22. Numeral 23 indicates a tire clamping handle.

The laterally movable carriage 3 is moved in the transverse direction parallel with the tire support shaft 21 (in Y-axis direction) on rail 31 parallel with the tire support shaft 21 by means of a motor and a screw which are not shown. Numeral 32 is a vertically movable block which is supported by the laterally movable carriage 3 and is moved along guide shafts 33 in the vertical direction (in Z-axis direction) through a ball screw in which the screw shaft is rotated by a motor 34.

Moreover, the laterally movable carriage 3 may be moved perpendicularly to the axis of the tire support shaft 21, namely in the back and forth direction to the tire 7 (in the X-axis direction) on rails 36 in the base 1 along a guide bar 37 by means of a motor and a screw shaft (not shown), and thereby the degree of freedom in movement can be increased at the time of grooving a large size tire.

A pivotable arm support shaft 38 extended from the side of vertically movable block 32 has the axis 39, which coincides with the cutting position P of cutter, which moves on the cutter along the Z-axis direction accompanying with the up and down movement of the cutter in the X-axis direction perpendicularly to the tire support shaft 21, wherein the shaft is rotated around the axis 39 through a reduction gear (not shown) in the direction indicated by an arrow A in FIG. 2 by a motor (not shown) in the vertically movable block 32 so as to regulate the direction of the cutter 6 with a desired angle to coincide with the curved surface of the tire tread. It is particularly desirable that the axis 39 should coincide with the tangential line of a plain tire.

When the cutting position of cutter coincides with the axis 39 of the pivotable arm support shaft 38 as described above, since the cutting position coincides with the moving center, the quantity of movement of the cutter tip is calcualted only by multiplying the rotated angle by the distance from the cutting position of the cutter to the tip, and the program control can be easily performed by a computer.

Hereinafter, the cutter support unit 5 is described in detail.

Figure 3:
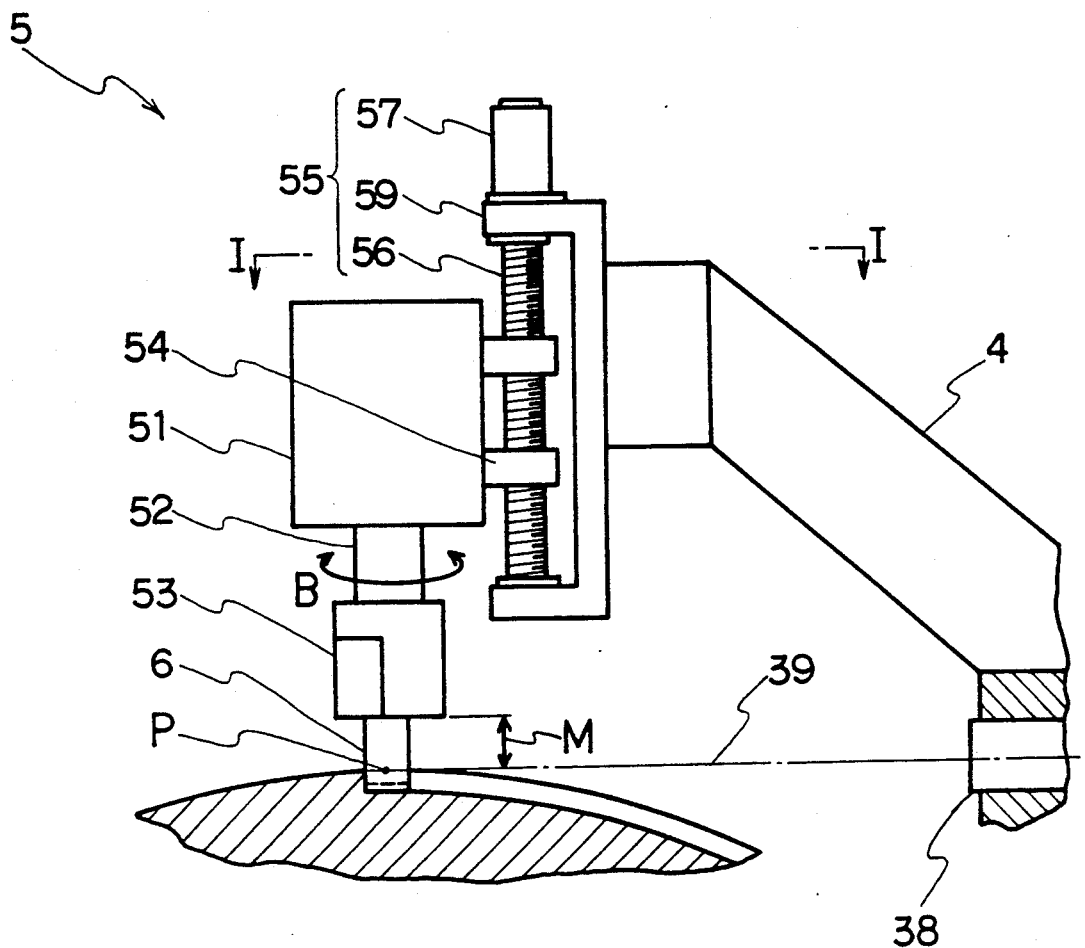
FIG. 3 is a partially enlarged view of the cutter support unit of the grooving apparatus shown in FIG. 1.
Figure 4:
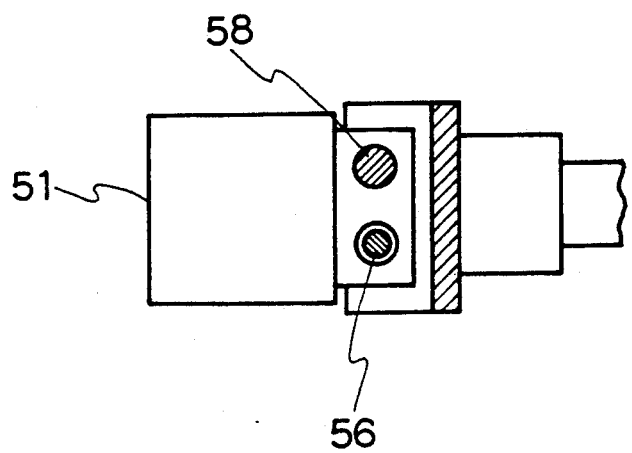
FIG. 4 is a sectional view taken along the line I—I of FIG. 3.

As shown in FIGS. 3 and 4, the cutter support unit 5 comprises a cutter support unit body 51, a rotatable shaft 52 extended from the bottom of the body 51, a cutter holder 53 connected with the lower end of the rotatable shaft 52, support pieces attached perpendicularly to the side facing the pivotable arm and a vertically movable mechanism 55. The vertically movable mechanism 55 comprises a U-shaped framework element 59 having a screw shaft 56 and a guide shaft 58. The free end portion of the pivotable arm 4 is fixed on the surface opposite to the screw shaft 56 in the framework element 59. Two support pieces 54 are shown in FIG. 3, but the number of the support piece 54 is not limited to 2. If it is large enough to support the weight of cutter support unit 5 and move the cutter support unit 5 in the vertical direction with desired accuracy, a support piece 54 is adoptable. The support pieces 54 have a tapped hole and a penetrated hole as shown in FIG. 4. The tapped hole engages with the screw shaft 56, and the guide shaft 58 is inserted into the penetrated hole. Since the screw shaft 56 is required to position the cutter support unit with high accuracy, for example, within 0.1 mm, a ball screw is used. The screw shaft 56 is driven through a reduction gear (not shown) by means of that motor 57 controlled by a position adjustment program or by a digital switch provided separately which is connected with the upper end of the screw shaft. As to the motor 57, a servo motor is used for high accuracy control. The screw shaft 56 is rotated a desired number of times by the servo motor 57, and thereby the cutter support unit 5 independently is moved in the up (down) direction by a predetermined quantity and adjusts the carving depth of the cutter 6 attached to the lower end portion of the cutter support unit 5. The cutting position of the cutter moves in the up (down) direction according to the down (up) movement of the cutter 6, so that it always coincide with the axis of the shaft 39. Accordingly, the carving depth can be changed easily, and accurate tread patterns can be formed.

Moreover, the rotatable shaft 52 is rotated through a reduction gear in the direction indicated by an arrow B by a motor which is provided in the cutter support unit body 51 (refer to FIG. 3), and thereby changes the direction of the cutter 6 held in the cutter holder 53, so that desired tread patterns can be formed.

Figure 5:
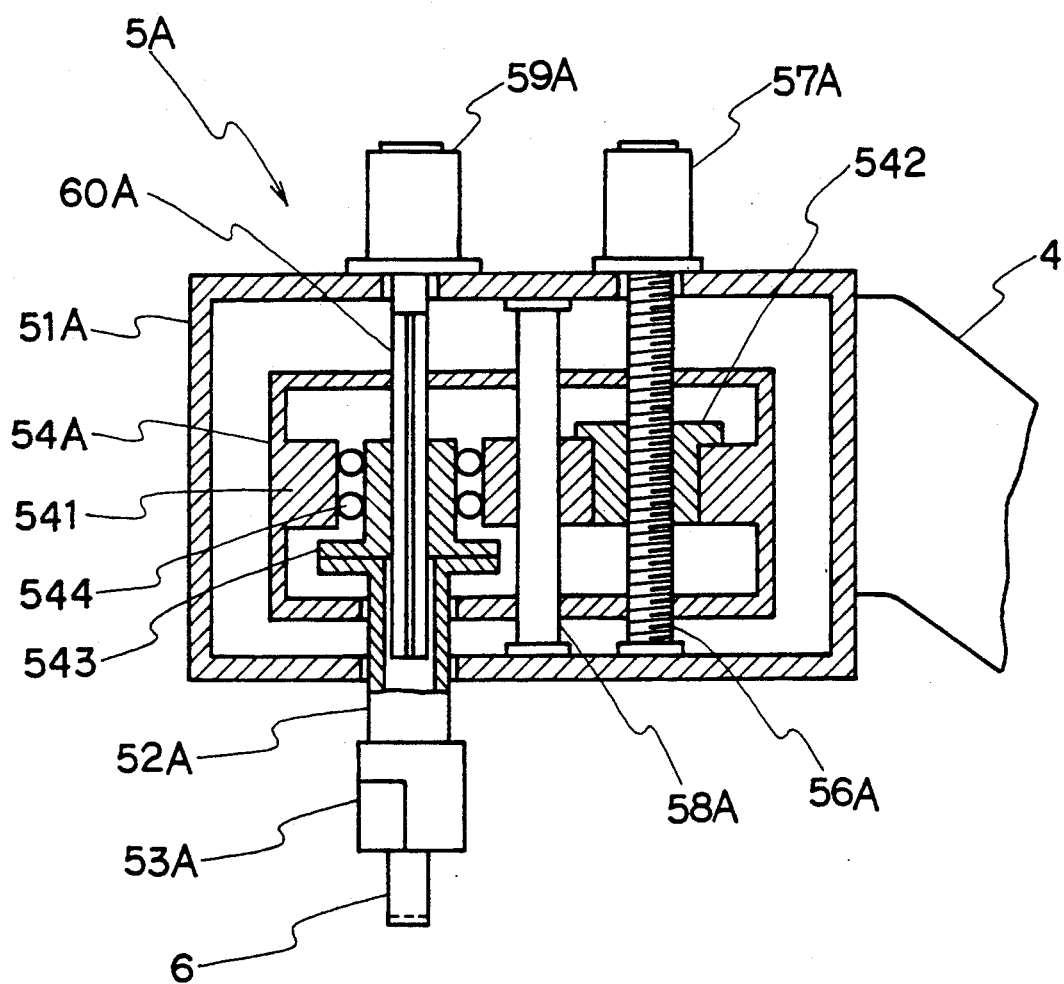
FIG. 5 is a partial sectional view of the cutter support unit for the grooving apparatus of another embodiment of the present invention.
Figure 6:
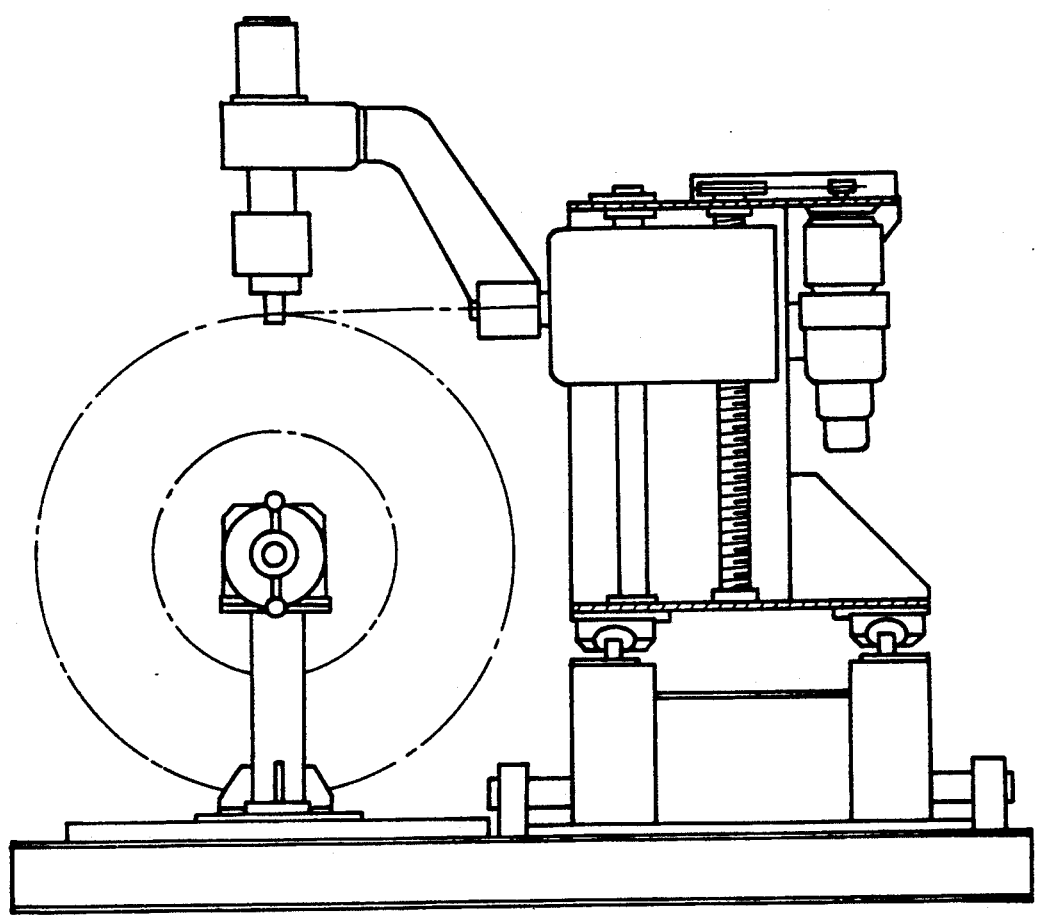
FIG. 6 is a side view of a conventional tire grooving apparatus.
Figure 7:
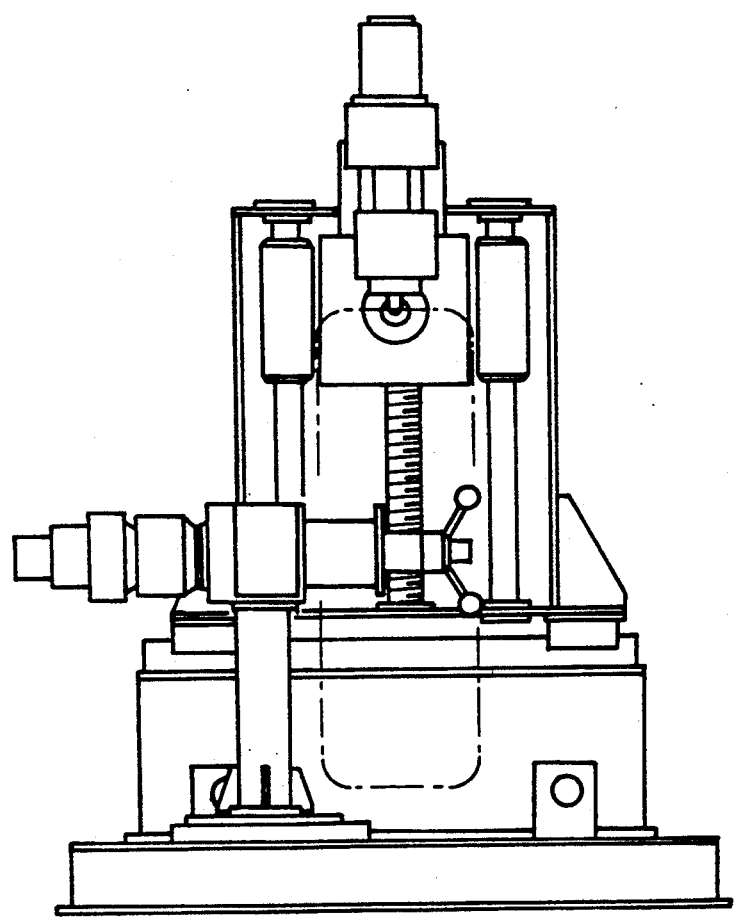
FIG. 7 is a front view of the grooving apparatus shown in FIG. 6.
Figure 8A:
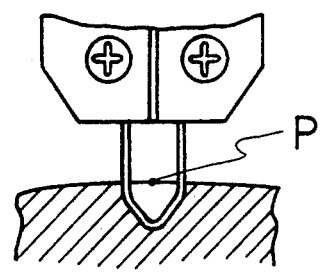
FIGS. 8A and 8B are explanatory illustrations of the cutter position during carving.
Figure 8B:
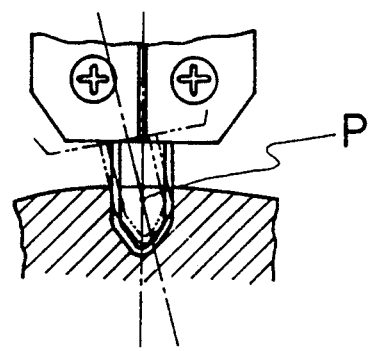

FIG. 5 is a sectional view of the main part of another embodiment of the present invention. In the embodiment shown in FIG. 5, a cutter support unit 5A is similarly held by a pivotable arm 4. Namely, the side of the cutter support unit body 51A is fixed to the free end portion of pivotable arm 4. A box body 54A is contained in the body 51A. A support element 541 is provided near the center of the internal portion of the box body 54A. A female screw element 542 and a rotating sleeve 543 are mounted on the supporting element 541. The female screw element 542 engages with the screw shaft 56A which is rotatably supported by the internal bottom of the body 51A, penetrates the box body 54A and extends to the top surface of the body 51A. The upper end of the screw shaft 56A is connected with a motor 57A having a reduction gear. The shape of the screw shaft, the pitch and the motor are selected in the same manner as the aforementioned embodiment. The screw shaft 56A is rotated by the motor 57A, whereby the box body 54A is moved in the up (down) direction along the guide shaft 58A which is extended from the box 54A and fixed by the body 51A. When the box body 54A moves in the up (down) direction, the cutter 6 held in the cutter holder 53A which is mounted on the lower end of the rotatable shaft 52A which is connected with the lower end of the rotatable sleeve 543 mounted on the box body 54A and is extended from the bottom of the box body 54A and body 51A. Furthermore, the rotatable sleeve 543 has a hole on which surface is provided a plurality of longitudinally formed grooves. The spline shaft 60A extending from a motor 59A with a reduction gear from the top surface of the body 51A engages with the grooves. When the spline shaft 60A is rotated by the motor 59A with the reduction gear, the rotatable sleeve 543 mounted on the support element 541 through a bearing 544 is also rotated. The direction of the cutter 6 can be changed by rotating the rotatable sleeve 543.

As described above, in the present embodiment, the cutter 6 can be also moved in the vertical direction so that the cutting position always coincides with the axis of shaft 39, and further the axis of shaft 39 can coincide with the tangential line of the plain tire. Accordingly, in the present embodiment, the tread patterns which have various depth of the grooves can also be formed accurately by means of the cutter of the same size.

As described above, in the tire grooving apparatus of the present invention, since the cutter support unit can be moved up and down independently, the depth of tread pattern grooves can be easily changed, and moreover accurate tread patterns can be formed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A tire grooving apparatus comprising
   a tire support unit including a tire support shaft adapted to rotatably support a tire,
   a carriage, including means for moving said carriage parallel to the tire support shaft,
   a block mounted on said carriage and means operatively connected to said block for moving the block in the vertical direction,
   a block shaft extending from and rotatably supported by said block,
   a pivotable arm member pivotably supported at one end portion by said shaft, and
   a cutter supported by a cutter support unit and disposed at the other end portion of the pivotable arm member, said cutter support unit including means for independently moving said cutter support unit in a direction perpendicular to the axis of said block shaft extending from said block to position said cutter coincident with the axis of said shaft.

2. The tire grooving apparatus of claim 1, wherein the means for independently moving said cutter support unit comprises a frame member for supporting said cutter support unit, said frame member containing a guide shaft, a screw shaft and a motor means for rotating said screw shaft which, in turn, moves the cutter support unit in said perpendicular direction.

* * * * *